United States Patent
Hammer et al.

(10) Patent No.: US 8,639,457 B2
(45) Date of Patent: Jan. 28, 2014

(54) METHOD FOR ASCERTAINING AND MONITORING FILL LEVEL OF A MEDIUM IN A CONTAINER USING A TRAVEL TIME MEASURING METHOD

(75) Inventors: Manfred Hammer, Wehr (DE); Alexey Malinovskiy, Weil am Rhein (DE); Edgar Schmitt, Friesenheim (DE); Herbert Schroth, Schopfheim (DE); Dietmar Spanke, Steinen (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 564 days.

(21) Appl. No.: 12/735,970

(22) PCT Filed: Aug. 11, 2008

(86) PCT No.: PCT/EP2008/060498
§ 371 (c)(1),
(2), (4) Date: Jan. 24, 2011

(87) PCT Pub. No.: WO2009/030582
PCT Pub. Date: Mar. 12, 2009

(65) Prior Publication Data
US 2011/0166805 A1 Jul. 7, 2011

(30) Foreign Application Priority Data
Sep. 5, 2007 (DE) .......................... 10 2007 042 042

(51) Int. Cl.
*G01F 23/00* (2006.01)
(52) U.S. Cl.
USPC ............... 702/55; 702/50; 702/127; 702/159; 342/124

(58) Field of Classification Search
USPC ............................................... 702/50, 55, 159
See application file for complete search history.

(56) References Cited

U.S. PATENT DOCUMENTS 3,818,232 A * 6/1974 Kirkpatrick ..................... 378/52
5,365,178 A * 11/1994 Van Der Pol ................. 324/644
(Continued)

FOREIGN PATENT DOCUMENTS

| DE | 42 18 303 C1 | 3/1994 |
| DE | 103 60 710 A1 | 10/2005 |
| DE | 10 2004 055 551 A1 | 5/2006 |
| DE | 10 2006 062 606 A1 | 7/2008 |

OTHER PUBLICATIONS

Bartsch, H.J., Mathematische Formeln, published by Buch- Und Zeit-Verlagsgesellschaft mbH, Koln, 1982.

*Primary Examiner* — Mischita Henson
(74) *Attorney, Agent, or Firm* — Bacon & Thomas, PLLC

(57) ABSTRACT

A method for ascertaining and monitoring the fill level of a medium in a container via a field device, wherein transmission signals are transmitted toward the medium and are received as reflection signals. The transmission signals and the reflection signals are registered by means of data points in an envelope curve dependent on travel time or travel distance. Disturbance echo signals are registered by means of data points in a masking curve, the data points are connected with one another via connecting functions An evaluation curve is ascertained from the envelope curve; wherein, by means of a reduction algorithm, the number of data points in the masking curve and/or in the evaluation curve is reduced; and wherein, by an echo search algorithm, by means of the reduced masking curve and/or reduced evaluation curve, at least one wanted echo signal in the current envelope curve is ascertained.

16 Claims, 6 Drawing Sheets

(56) References Cited

U.S. PATENT DOCUMENTS

| | | | |
|---|---|---|---|
| 6,577,959 B1* | 6/2003 | Chajec et al. | 702/50 |
| 6,734,819 B2* | 5/2004 | Spanke | 342/124 |
| 6,879,425 B2* | 4/2005 | Damm et al. | 359/272 |
| 2003/0167838 A1* | 9/2003 | Spanke et al. | 73/290 R |
| 2006/0161374 A1* | 7/2006 | Hillam et al. | 702/130 |
| 2006/0201246 A1* | 9/2006 | Rolfes et al. | 73/290 V |
| 2007/0214880 A1* | 9/2007 | Spanke et al. | 73/290 V |
| 2009/0235736 A1* | 9/2009 | Spanke et al. | 73/290 V |

\* cited by examiner

METHOD FOR ASCERTAINING AND MONITORING FILL LEVEL OF A MEDIUM IN A CONTAINER USING A TRAVEL TIME MEASURING METHOD

TECHNICAL FIELD

The present invention relates to a method for ascertaining and monitoring fill level of a medium in a container using a travel time measuring method.

BACKGROUND DISCUSSION

Such methods for ascertaining and monitoring fill level in a container are frequently applied in measuring devices of automation and process control technology. Such fill level measuring devices are produced and sold by the assignee, for example, under the marks, Prosonic, Levelfiex and Micropilot. These work according to the travel time-measuring method and serve to determine and/or to monitor a fill level of a medium in a container. These fill level measuring devices transmit by means of a transmitting/receiving element a periodic transmission signal, in the form of microwaves or ultrasound, toward the surface of a fill substance, and receive the reflected echo signals after a distance-dependent travel time. Usual, commercially available fill level measuring devices working with microwaves can basically be divided into two classes; a first class, in the case of which the microwaves are transmitted by means of an antenna toward the fill substance, reflected off the surface of the fill substance, and then, after a distance-dependent travel time, are received back; and a second class, in the case of which the microwaves are conveyed along a waveguide toward the fill substance, are reflected off the surface of the fill substance due to an impedance jump existing there, and the reflected waves are led back along the waveguide.

The travel time measuring method can essentially be subdivided into two methods: The first method is based on a travel time measurement, which requires a pulse sequence modulated signal for the traveled path; a second widespread method is based on determining the frequency difference of the currently transmitted, continuously frequency-modulated high-frequency signal relative to the received, reflected high-frequency signal (FMCW—Frequency-Modulated Continuous Wave). Generally, in the following explanations, no limitation is made to a particular one of these methods.

From the received echo signals, there is formed, as a rule, an echo function representing the echo amplitudes as a function of travel time, wherein each value of this echo function corresponds to the amplitude of an echo reflected at a particular distance from the transmission element.

In this ascertained echo function, a wanted echo is determined, which corresponds to the reflection of the transmission signal off the surface of the fill substance. From the travel time of the wanted echo, there is directly obtained, in the case of known propagation velocity for the transmission signals, the distance between the surface of the fill substance and the transmission element.

In order to simplify the echo curve evaluation, the raw received signals of the pulse sequence are not used, but, instead, the envelope, the so called envelope curve, is ascertained. The envelope curve is acquired, for example, by rectifying the raw signal of the pulse sequence and then filtering via a lowpass.

There are a number of different methods for determining the wanted echo in an envelope curve.

In a first method, the wanted echo, which has a larger amplitude than the remaining echos, is selected by a static echo search algorithm. Thus, the echo in the envelope curve with the largest amplitude is ascertained as the wanted echo.

In a second method, it is assumed in a static echo search algorithm that the wanted echo is the first echo occurring in the envelope curve after the transmission pulse. Thus, the first echo in the envelope curve is selected as the wanted echo.

It is possible to combine these two methods with one another, in that, for example, a so-called first echo factor is defined. The first echo factor is a predetermined factor, by which an echo must exceed a particular amplitude, in order to be recognized as the wanted echo. Alternatively, a travel time-dependent echo threshold can be defined, which an echo must exceed, in order to be recognized as the wanted echo.

In a third method, the fill-level measuring device is informed once of the actual fill level. The fill level measuring device can, on the basis of this experience, identify the associated echo as the wanted echo, and, for example, follow it with a suitable dynamic echo search algorithm. Such methods are referred to as echo tracking. In such case, in, for example, each measuring cycle, maxima for the echo signal or the echo function are determined, and, based on the knowledge of the fill level ascertained in the preceding measuring cycle and an application-specific maximum rate of change to be expected for the fill level, the wanted echo is ascertained. From a travel time of the so ascertained, current wanted echo, the new fill level is then obtained.

A fourth method is described in DE 102 60 962 A1. There, the wanted echo is ascertained on the basis of data stored earlier in a memory. In such case, from received echo signals, echo functions are derived, which reflect the amplitudes of the echo signals as a function of their travel time. The echo functions are stored in a table, wherein each column in each case serves for recording an echo function. The echo functions are stored in the columns in a sequence, which corresponds to the fill levels associated with the particular echo functions. During operation, the wanted echo and the associated fill level are determined on the basis of the echo function of the current transmission signal with the assistance of the table.

In DE 103 60 710 A1, a fifth method is described, in the case of which, transmission signals are periodically transmitted toward the fill substance, their echo signals recorded and converted into an echo function, at least one echo characteristic of the echo function is determined, and, on the basis of the echo characteristics of at least one preceding measuring, a prediction for the echo characteristics to be expected in the case of the current measuring is derived. Taking into consideration the prediction, the echo characteristics of the current measuring are determined, and, on the basis of the echo characteristics, the current fill level is ascertained. This method approaches an echo tracking in the broadest sense.

In DE 10 2004 052 110 A1, a sixth method is described, which achieves improvement of the wanted echo detection by an echo evaluation and classification of the echos in the envelope curve.

Corresponding to the state of the art set-forth above, there are different approaches to determine the exact position of the fill level wanted/echo signal in the ascertained echo curve or in the digitized envelope curve. The accuracy of measurement that can be achieved with this echo measuring principle under the given measuring conditions depends, however, on what measurement accuracy can be achieved with this echo measuring principle under the given measuring conditions. Taken by themselves, these methods described above in each case work without problem in a large number of applications.

Problems always occur, however, when the echo stemming from the fill level cannot be identified on the basis of the method without there being some doubt as to the correctness of the identification.

In the case of the first method, for example, measurement problems occur, if installed objects are present in the container, which reflect the transmission signals better than the surface of the fill substance.

In the case of the echo tracking according to the third method, measurement problems occur if, during operation, the wanted echo overlaps a disturbance echo, and the disturbance echo is subsequently tracked as a wrong wanted echo. Furthermore, a problem occurs if, when the device is turned on, the previous wanted echo signal no longer agrees with the current one, or the previous wanted echo signal is not known.

If another echo than the fill-level echo is mistakenly classified as the wanted echo, the danger exists that a wrong fill level is output, without this being noticed. This can, depending on application, lead to an overfilling of containers, to pumps running empty or to other events in given cases connected with considerable dangers.

SUMMARY OF THE INVENTION

An object is of the invention to provide an improved and adaptable method for determining wanted echo signals in echo curves.

The object is achieved according to the invention by a method for ascertaining and monitoring fill level of a medium in a container using a field device, wherein transmission signals are transmitted toward the medium and are received as reflection signals; wherein the transmission signals and the reflection signals are registered by means of data points in an envelope curve dependent on travel time or travel distance; wherein disturbance echo signals are registered by means of data points in a masking curve, which is ascertained in a first measuring cycle from the envelope curve of the empty container; wherein an evaluation curve is ascertained from the envelope curve by a smoothing procedure in a first measuring cycle; wherein the data points are connected with one another via connecting functions and intermediate values are thus produced; wherein, for improving processability of the masking curve and/or the evaluation curve, the number of data points in the masking curve and/or in the evaluation curve is reduced by means of a reduction algorithm; wherein, by an echo search algorithm, by means of the reduced masking curve and/or reduced evaluation curve, at least one wanted echo signal in the current envelope curve is ascertained.

In a preferred form of embodiment of the method of the invention, it is provided that the data points of the envelope curve, the masking curve and/or the evaluation curve are reduced by a sectionally linear approximation serving as the reduction algorithm, in that, for all data points of at least a section of the envelope curve, the masking curve and/or the evaluation curve, the amplitude spacings of the data points are ascertained with respect to a line between left and right neighboring data points, and data points having smallest ascertained amplitude spacings are deleted, at least in such section.

In another advantageous embodiment of the method of the invention, the piecewise linear approximation is performed cyclically, until a predetermined deviation of amplitude spacings and/or a predetermined number of data points is reached.

An advantageous embodiment of the solution of the invention provides that data points of the masking curve and/or the evaluation curve are reduced by a linear regression serving as the reduction algorithm, in that superfluous data points not lying on the regression lines are deleted.

A very advantageous variant of the method of the invention provides that data points of the masking curve and/or the evaluation curve are reduced by the reduction algorithm to the extreme points, peaks and/or inflection points of the masking curve and/or the evaluation curve.

An especially advantageous further development of the method of the invention provides that data points in the masking curve and/or the evaluation curve are periodically deleted in a predetermined interval by the reduction algorithm.

A preferred form of embodiment of the method of the invention provides that, at each data point in the masking curve and/or the evaluation curve, the slope of the connecting functions adjoining on both sides are compared with one another by the reduction algorithm, and, in the case of subceeding, or falling beneath, a predetermined difference value of the two slopes, such data point is deleted.

In an advantageous form of embodiment of the method of the invention, it is provided that, during the operating mode of the field device, on the basis of a dynamic echo search algorithm and by means of an echo tracking of the wanted echo signal and/or of disturbance echo signals in a defined search window, values and/or positions of the individual data points in the masking curve and/or the evaluation curve are automatically edited and/or adjusted.

A purpose-supporting example of an embodiment of the method of the invention provides that histories of the values and/or positions of the individual data points in the masking curve and/or the evaluation curve are stored and/or represented as at least one maximum state and/or minimum state in at least one drag-pointer.

A very advantageous variant of the method of the invention provides that, in a processing mode, the number and/or the distance of the data points for performing the reduction algorithm, the connecting functions of the individual data points and/or additional data points are specified via an input/output unit on the field device and/or via an external service unit.

A purpose-supporting, alternative example of an embodiment of the method of the invention provides that, in a processing mode, the positions of individual data points and/or groups of data points are changed via an input/output unit on the field device and/or via an external service unit.

In an additional advantageous embodiment of the method of the invention, it is provided that positions of individual data points and/or groups of data points are changed by means of an equalizing function with adjustable influence profiles, which align positions of neighboring data points corresponding to the adjusted influence profiles.

An advantageous form of embodiment of the solution of the invention provides that, in the processing mode, additional data points are specified as peaks with adjoining, falling, connecting functions having a predefined length and/or a predefined slope.

In an additional advantageous embodiment of the method of the invention, it is provided that, in regions between two data points, in which two connecting functions overlap, a new connecting function is formed, which connects these two data points with one another.

In another advantageous embodiment of the method of the invention, additional data points are placed in the masking curve and/or the evaluation curves, and these additional data points are integrated into the existing masking curve and/or the evaluation curve by newly-formed connecting functions.

A very advantageous variant of the method of the invention provides that connecting functions comprise at least a piecewise linear interpolation, a spline interpolation and/or a polynomial interpolation.

In an additional advantageous embodiment of the method of the invention, it is provided that the envelope curve, the masking curve and/or the evaluation curve are sectionally either newly produced in a replacement mode, or, in a superimposing mode, are formed from maximum values of old, stored and newly recorded envelope, masking and/or evaluation curves.

BRIEF DESCRIPTION OF THE DRAWING

Other details, features and advantages of the subject matter of the invention will become evident from the following description with the associated drawings, in which preferred examples of embodiments of the invention are presented. In the examples of embodiments of the invention shown in the figures, for greater perspicuity and for simplification, elements which correspond in their construction and/or in their function are provided with equal reference characters. The figures of the drawing show as follows:

FIG. 1 shows a measuring device 1 for ascertaining fill level h of a medium 7. Device 1 works according to the travel time-measuring method. Mounting of device 1, by way of example, is on a process connection nozzle of a container 5. The illustrated measuring device 1 comprises a measurement transmitter 9 and a transmitting/receiving element 6 freely radiating into the process space. The measurement transmitter 9 includes: At least one transmitting/receiving unit 3, which effects production and receipt of measuring signals, such as, for example, ultrasound or microwave signals; a control/evaluation unit 2, which enables signal processing of the measuring signals and control of the measuring device 1; and, a communication unit 4, which controls and regulates communication via a bus system, as well as the energy supply of the measuring device 1. Integrated into the control/evaluation unit 2 is, for example, a memory element, in which measurement parameters, evaluating parameters and echo curves are stored. Via the communication unit 4, the measuring device 1 communicates, for example, with an external service unit 29, which is embodied, for example, as a mobile computer, a notebook and/or a personal digital assistant (PDA), in order to enable a simpler and more comprehensive servicing of the measuring device 1. External service unit 29 is connected, at least at times, via a radio network (e.g. WLAN) or via a connecting line, with the measuring device 1, and communicates via this radio network or via the connecting line with the measuring device 1. Likewise, by means of an input/output unit 28 integrated into the measuring device 1, the measuring device 1 can be serviced, and graphs presented, for instance, in the form of an echo function 10.

Figure 1:
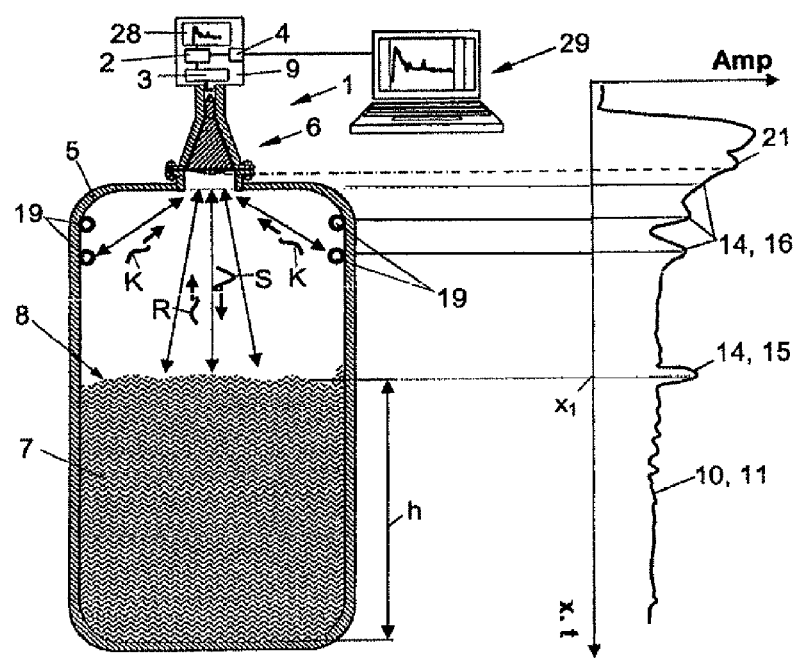
FIG. 1 is an example of an embodiment of a measuring device for ascertaining fill level, along with a corresponding echo function.

The transmitting/receiving element 6, in this example of an embodiment, is provided, for example, in the form of a horn antenna, via which a microwave signal, as a transmission signal S, is radiated with a predetermined radiation characteristic toward the medium. Equally, the transmitting/receiving element 6 can be embodied in any known, freely radiating, antenna form, such as e.g. a rod, parabolic or planar antenna, or, as employed according to the method of time-domain reflectometry, be embodied as a measuring probe conveying high-frequency microwave signals, e.g. a rod or cable. Additionally, an ultrasonic sensor can also be used as a transmitting/receiving element 6 for determining travel time of an ultrasonic signal according to the sound-measuring method, or an optical sensor for determining travel time of a light signal according to the optical measuring method. As regards the microwave measuring method, there is produced in the transmitting/receiving unit 3, for example, a high-frequency microwave signal as transmission signal S, and, via the antenna as a corresponding transmitting/receiving element 6, transmitted or radiated with a predetermined radiation characteristic toward the medium 7. After a travel time t dependent on a travel distance x, the transmission signals S, at least partially reflected on the interface 8 of the medium 7, are received by the transmitting/receiving element 6 and the transmitting/receiving unit 3 as a reflection signal R. The control/evaluation unit 2 connected downstream ascertains from the reflection signals R an echo function 10, which shows amplitude values Amp of the echo signals 14 of these reflection signals R as a function of travel distance x or the corresponding travel time t. Through filtering and analog/digital conversion, an enveloping, digitized, envelope curve 11 is produced from the analog echo function or the echo curve 10. In the case of use of a microwave signal as the transmission signal S, the transmitting/receiving unit 3 includes at least one HF-module, which, for example, produces high-frequency, pulse-shaped transmission signals S in the gigahertz range, e.g. 6 GHz or 26 GHz, and a homodyne and/or heterodyne receiver, in which the received reflection signals R are preprocessed and converted, time expanded, into an envelope curve 11. In the following, the term "echo function 10" is used in the description, with the understanding that this term likewise implies the terms "echo curve 10", "envelope function", or "digital envelope curve 11", as the case may be.

An echo function 10 mapping the measuring situation in the container 5 is graphically presented in FIG. 1 as a function of the travel distance x of the transmission signal S. For better presentation, the curve diagram is mapped in a rotated manner, and the disturbance elements 19 are indicated via reference lines associated with the corresponding disturbance echo signals 16 in the echo function 10, so that cause and effect can be registered at a glance. A zero line 21 defines from which position the measuring range of the measuring device 1 begins. In the beginning region of the echo function 10, approximately around the zero line 21, the decay behavior, or the so-called ringing, is to be seen, which can arise due to multiple reflections, or additionally through accretion formation in the transmitting/receiving element 6 or the nozzle. These disturbance echo signals are also referred to as clutter. Travel distance x or travel time t is measured on the abscissa, and the amplitude value Amp on the ordinate of the Cartesian coordinate system of the graph.

According to the current state of the art, there are different approaches to determine the exact position $x_1$ of the wanted echo signal 15 in the echo function 10 or the digital envelope curve 11. Dependent on the exact determining of the measuring position of the fill level F in the echo function 10 is the accuracy of measurement achieveable with this echo measuring principle under the given measuring conditions.

Figure 2:
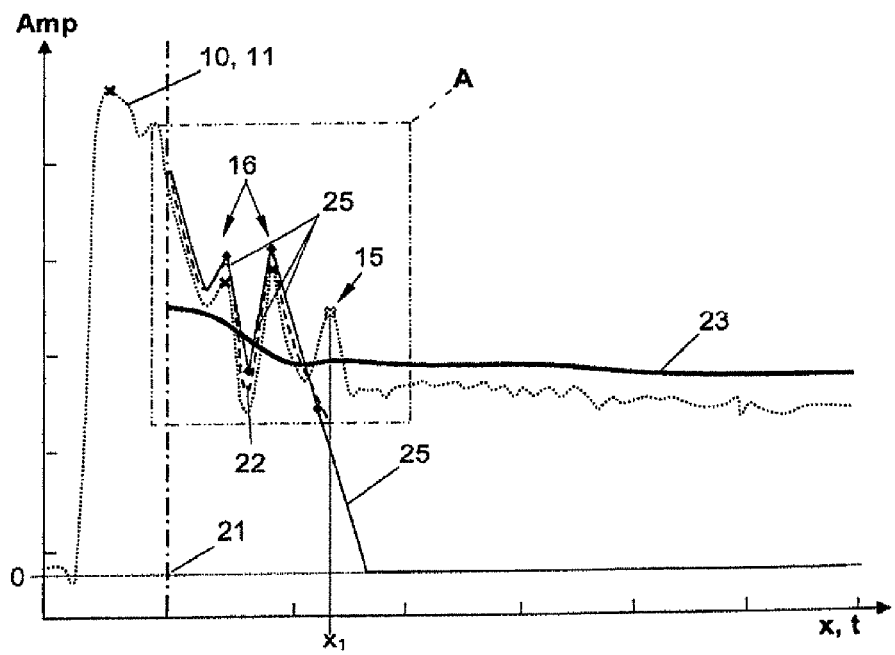
FIG. 2 is a first graph from the measuring device of FIG. 1, showing an evaluation curve and a masking curve.

One approach for determining exact position $x_1$ of the wanted echo signal 15 for ascertaining fill level h in the ascertained echo function 10 is shown in FIG. 2. There, the echo function 10 of FIG. 1 is enlarged and rotated such that it is horizontal. Plotted on the abscissa is the required travel time t or travel distance x traveled by the transmission signal S and by the reflection signal S in the container 5, while the ordinate shows the amplitude values Amp of the echo function 10 of the measurement signal.

Shown in the graph of FIG. 2, besides the echo function 10, is an evaluation curve 23, which, for example, by means of a static echo search algorithm, e.g. with the assistance of a sliding average formation as a mathematical filter function, is ascertained from a specially determined echo function 10 and/or by means of an echo function 10 ascertained at start-up in the empty container 5. This evaluation curve 23 is used for ascertaining wanted echo signals 15 in the echo function 10. Accordingly, this evaluation curve 23 is used as a reference line or departure criterion for the static echo search algorithm for determining wanted echo signals 15 in the echo function 10. Signal components which lie above the ascertained evaluation curve 23 are identified by the static echo search algorithm as wanted echo signals 15.

Shown furthermore in the graph is a masking curve 22, on the basis of which continuous disturbance echo signals 16 and/or noise signals, which, for example, can arise through disturbance reflections off installed objects 19 in the container 5, through multipath propagation and through multimode propagation, through foam and accretion formation of the medium 7 and through turbulent medium surfaces 8, are masked out.

Both curves, the evaluation curve 23 and the masking curve 22, begin from a zero line 21, which establishes the measuring range limit of the measuring device 1 and gives the end position up to which, for structural reasons of the measuring device 1, a measuring of the fill level h is possible. This measuring range limit, or the measuring range, is, for example, established by the surfaces of a horn antenna being filled with a fill material as a transmitting/receiving element 6.

For establishing measuring conditions and the evaluation condition of the static and dynamic echo search algorithms, depending on the type of measuring device 1 and its application, an abundance of different parameters are required. Among these parameters are also data concerning geometry of the container 5 used, an empty distance of the container 5, and a zero line 21 characterizing the upper limit of the measuring range. In addition to these, there exists, as a rule, an application dependent and/or measuring device specific, block distance, within which, due to disturbance signals 16 or measuring circuit characteristics, no measuring of the fill level h is possible.

Selection rules for determining wanted echo signal 15 also play an important role. These static selection rules are frequently referred to in the industry as the "first echo factor". Such selection rules can, depending on application, specify that that echo signal 14 having the shortest travel time is to be selected as the wanted echo signal 15, that that echo signal 14 with the largest amplitude values Amp is to be selected as the wanted echo signal 15, or that the wanted echo signal 15 is to be selected on the basis of a weighting function, which takes into consideration travel times t and amplitude values Amp of the echo signals 14.

By means of these selection rules, the evaluation curve 23 and the masking curve 22, the position $x_1$ of the wanted echo signal 15 in the echo function 10 is determined. If, however, the measuring conditions of the measuring device 1 and/or of the process change, the previously ascertained, stored values for the selection rules, the evaluation curve 23 and the masking curve 22 may have no reference to the current measuring situation, and thus deliver a wrong measured value. For example, through additional installed objects in the container 5 which are applied at least at times, a further disturbance signal 16 can be produced in the echo function 10, which is not masked out by the masking curve 22, and thus can be recognized by the echo search algorithm as a wanted echo signal 15. On the other hand, it is possible that the disturbance signals 16 change due to accretion formation or condensate formation of the medium 7, and due to installed objects 19, and are no longer suppressed or masked out by the masking curve 22.

According to the invention, the envelope curve 11, the masking curve 22 and/or the evaluation curve 23 is sectionally either newly produced in a replacement mode, or, in a superimposing mode, formed from the maximum values of old stored and newly recorded instances of the envelope curve 11, masking curve 22 and/or evaluation curve 23. In the replacement mode, the stored envelope curve 11, the stored masking curve 22 and/or the stored evaluation curve 23 is at least sectionally overwritten in this section by the newly recorded curves. In the superimposing mode, the envelope curve 11, the masking curve 22 and/or the evaluation curve 23 is at least sectionally newly recorded and the new curves are compared with the stored curves, in order that only maximum values of the amplitudes of the new and stored curves are stored again. This superimposing mode has the advantage, that disturbance echo signals 16 occurring only sporadically, e.g. a rotating stirring blade in the container 5, can be masked out by the masking curve 23 registered in this superimposing mode.

Furthermore, it is possible that, due to a difficult measuring situation in the container 5, the evaluation curve 23 and/or the masking curve 22 d cannot be ascertained exactly, or can only partially be ascertained. In these cases, it is, for example, necessary to form the graphs shown on the input/output unit 28 or on the external service unit 29 in an editable manner from at least the echo function 10, evaluation curve 23 and masking curve 22.

The echo function 10, the evaluation curve 23 and/or the masking curve 22 is constructed from data points, which are connected with one another via connecting functions 13, and thereby produce intermediate values between the data points 12. According to the invention, data points 12 of the masking curve 22 and/or the evaluation curve 23 are reduced by a reduction algorithm. The reduction of the data points 12 in the masking curve 22 and/or the evaluation curve 23 are necessary to reduce the curve shapes of the masking curve 22 and/or the evaluation curve 23 to the most fundamental characteristics of the curves and, thus, also to enable a simple matching. There are a number of options and methods to reduce the number of data points 12 in the masking curve 22 and/or the evaluation curve 23; in the following, some examples are presented:

A first opportunity for a reduction algorithm is that data points 12 of the masking curve 22 and/or the evaluation curve 23 are reduced by a linear regression, in which superfluous data points 12b, which do not lie on the regression lines 24, are deleted. In linear regression, there is placed, according to the least squares method, for example, a regression line 24 through a predetermined number of data points 12, such that the sum of the squares of the deviations of all data points 12 from this regression line 24 is minimized.

A second opportunity for a reduction algorithm is that data points 12 of the masking curve 22 and/or the evaluation curve 23 are reduced by the reduction algorithm to the extreme points, peaks 26 and/or inflection point 27 of the masking curve 22 and/or the evaluation curve 23.

A third opportunity for a reduction algorithm is that data points 12 in the masking curve 22 and/or the evaluation curve 23 are periodically deleted by the reduction algorithm in a predetermined interval. This reducing of the data points 12 occurs, for example, in such a manner, that, in a processing mode, the number and/or the distance of the data points 12 for performing the reduction algorithm, the connecting functions 13 of the individual data points 12 and/or additional data points 12a are specified via an input/output unit 28 on the field device 1 and/or via an external service unit 29.

A fourth opportunity for a reduction algorithm is that, at each data point 12 in the masking curve 22 and/or in the evaluation curve 23, the slope 17 of the connecting functions 13 adjoining on both sides are compared with one another by the reduction algorithm, and, in the case of subceeding, or falling beneath, a predetermined difference value for the two slopes 17, such data point 12 is deleted. The difference value is, for example, predetermined by the operator via the input/output unit 28 as a corresponding parameter. If the current slopes of the connecting functions 13 at the data point 12 in question lie below this predetermined difference value, i.e. the current change in the connecting functions 13 at this data point 12 is very small, this current data point 12 is then deleted.

A fifth opportunity for a reduction algorithm is that data points 12 of the echo function 10, the envelope curve 11, the masking curve 22 and/or the evaluation curve 23 are reduced by a sectionally linear approximation serving as the reduction algorithm. For this, for all data points 12 of at least a section of the echo function 10, the envelope curve 11, the masking curve 22 and/or the evaluation curve 23, the amplitude spacings dy of the data points 12 are ascertained with respect to a line 30 between a left neighboring data point 12l and a right neighboring data point 12r, and are stored in a list with the coordinates of the data point. The reduction algorithm searches for data points 12 in at least one section of the echo function 10, the envelope curve 11, the masking curve 22 and/or the evaluation curve 23 with the smallest ascertained amplitude spacings dy, and erases these from the list and from the curves. After the deleting, the amplitude spacings dy of the left neighboring data point 12l and of the right neighboring data point 12r of an erased data point 12 must be calculated again by the reduction algorithm and be written into the list. This sectionally linear approximation is, for example, cyclically performed until a predetermined deviation of the amplitude spacings dy and/or a predetermined minimal number of data points 12 is reached.

Figure 3:
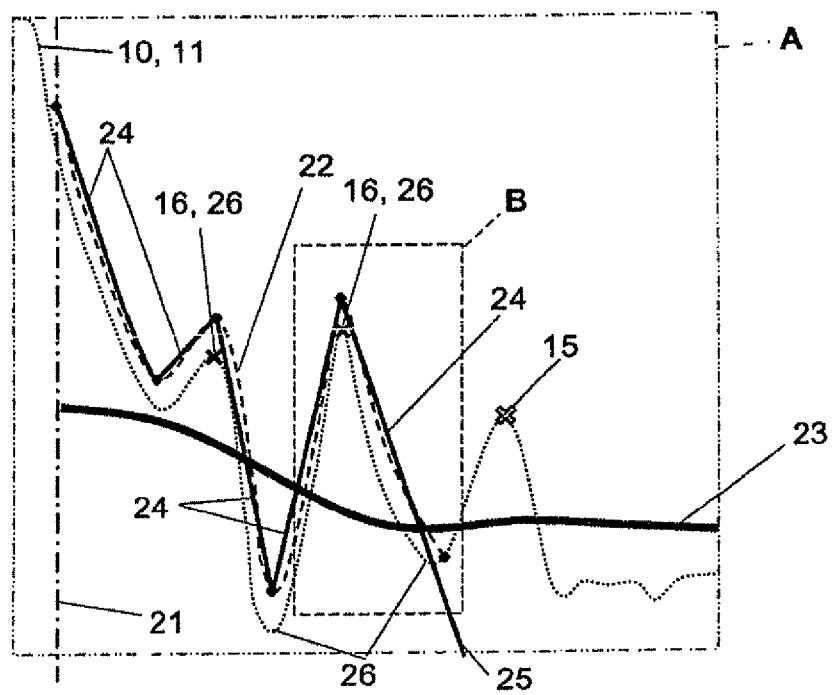
FIG. 3 is an enlargement of detail A of the graph of FIG. 2.

FIG. 3 shows an enlargement of detail A of the envelope curve 11 of an echo function 10, the evaluation curve 23, the masking curve 22 and the reduced masking curve 25 of FIG. 2. In this enlargement of the curves of detail A, the reproduction of the masking curve 22 as a reduced masking curve 25 is shown by regression lines 24 between certain particular data points 12, which, for example, lie at peaks 26 and points of inflection 27 of the masking curve 22. The reduced masking curve 25 is, for example, constructed from data points 12 at peaks 26, and points of inflection 27, which are connected with one another, for example, via linear functions serving as connecting functions 13. Through the reduction of the reduced masking curve 25 at only a few positions 12 by means of, for example, linear regression, there results a triangle-shaped curve form with so-called regression lines 24 serving as connecting functions 13. In FIG. 1 through FIG. 7, generally only the reduction of the masking curve 22 to a reduced masking curve 25 is shown; however, the reduction algorithm of the invention is also applicable to the evaluation curve 23 and/or the echo function 10.

Figure 4:
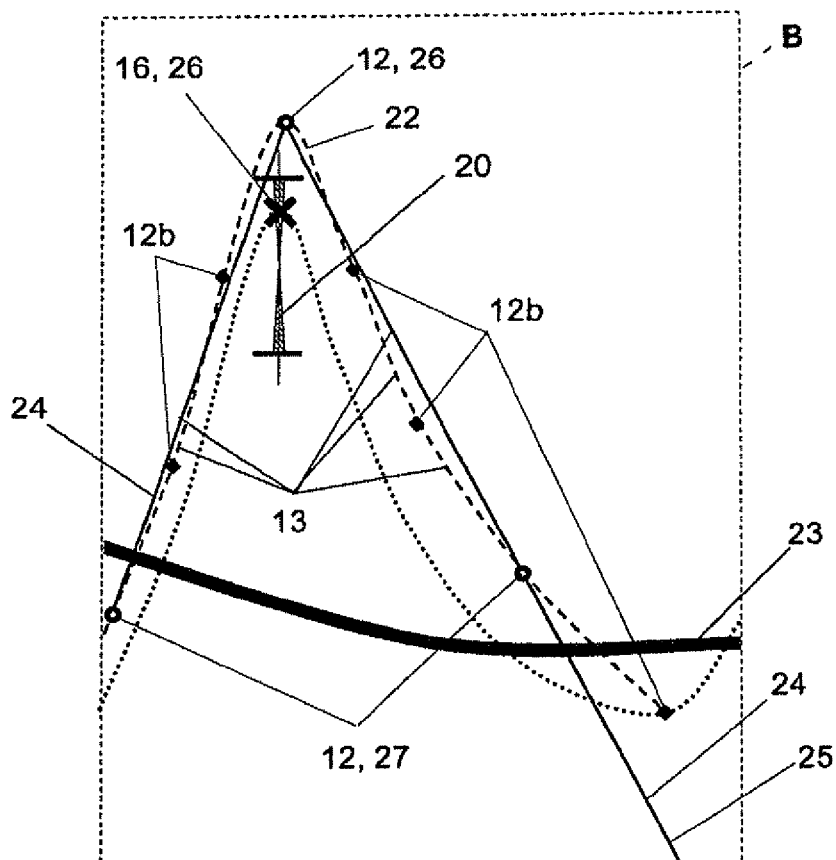
FIG. 4 is an enlargement of detail B of the graph of FIG. 3.

The first opportunity for reduction of the positions 12 of the masking curve 22 by means of a linear regression is shown in FIG. 4. FIG. 4 shows an enlarged section B of the graph of FIG. 3. In this section B, a disturbance echo signal 16 is shown, which is masked out by a masking curve 22, and thus is recognized no longer by the echo search algorithm of the measuring device 1. The masking curve 22 is constructed from positions 12, 12a and connecting functions 13, which connect these positions 12, 12a with one another and thereby produce intermediate values. In order to be able better to handle the masking curve 22 and to lessen the memory capacity needed in a memory unit for the positions 12,12a and the connecting functions 13 of the masking curve 22, a linear regression is performed, based on, for example, the peak 26 as a solid corner. By means of the linear regression, a regression line 24 starting from the corners between the additional positions 12, 12a is placed in such a manner, that the sum of the squares of the deviations of the data points 12b from this regression lines 24 is minimized. These data points 12b which differ from the regression lines 24 are thereafter deleted, and the reduced masking curve 25 is produced and presented.

Furthermore, drawn in FIG. 4 is a drag pointer 20, which shows the histories of the values and/or positions of the individual data points 12 in the masking curve 22 as at least one maximum state and/or a minimum state. By the term "value" is meant the amplitude value Amp, and by "position" is meant the position x, of the corresponding data point 12. In FIG. 4, for example, the history of the values is displayed for the data point 12 of the peak 26, in that the maximum value and the minimum value are displayed by a corresponding bar.

Figure 5:
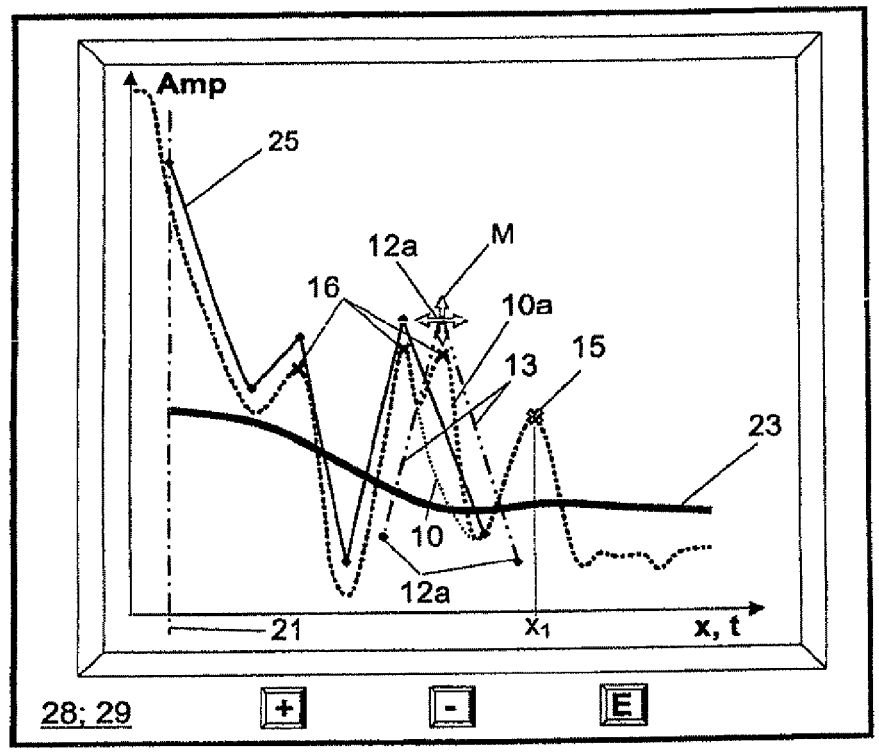
FIG. 5 is a second presentation of the graph of FIG. 1 at the beginning of the processing mode of the evaluation curve and/or the masking curve.

Shown in FIG. 5 are the curves, especially for echo function 10, in the case of a changing measuring situation in the container 5. For example, there is ascertained in the changed echo function 10a, from additional disturbance elements 19 in the container 5, a further disturbance echo signal 16, which is not registered by the reduced masking curve 25, and whose peak 26 lies above the evaluation curve 23. Through this measuring situation, it is possible for this disturbance echo signal 16 to be recognized by the echo search algorithm as the wanted echo signal 15.

Due to the changing measuring situation or through deviations of the measuring device 1, the ascertained echo function 10 changes. The changed echo function 10a is shown by a large dotted line and the echo function 10 is, for comparison, represented by a small dotted line in FIG. 5 through FIG. 7.

In order to avoid a malfunctioning of the echo search algorithms of the measuring device 1 and a new recording of the empty echo curve of the container 5, the operator of the measuring device 1 is given the opportunity to adapt the reduced masking curve 25 to the new measuring situation. On the input/output unit 28 of the measuring device 1 or the external service unit 29, the operator can display the curves of the echo function 10, the changed echo function 10a, the masking curve 22, the reduced masking curve 25 and/or the evaluation curve 23, and via an input option, e.g. a key or touch pad, modify the selected curve. For this, in a processing mode, an additional data point 12a serving as a peak 26 with falling connecting functions 13 adjoining on both sides, which have a predefined length 18 and/or a predefined slope 17, is specified by the operator via the input/output unit 28. The operator can, via a mouse pointer M, establish the position of the additional data point 12a, and, in additional steps, establish via the end points the length and the slopes of the falling connecting functions 13 adjoining on both sides.

Figure 6:
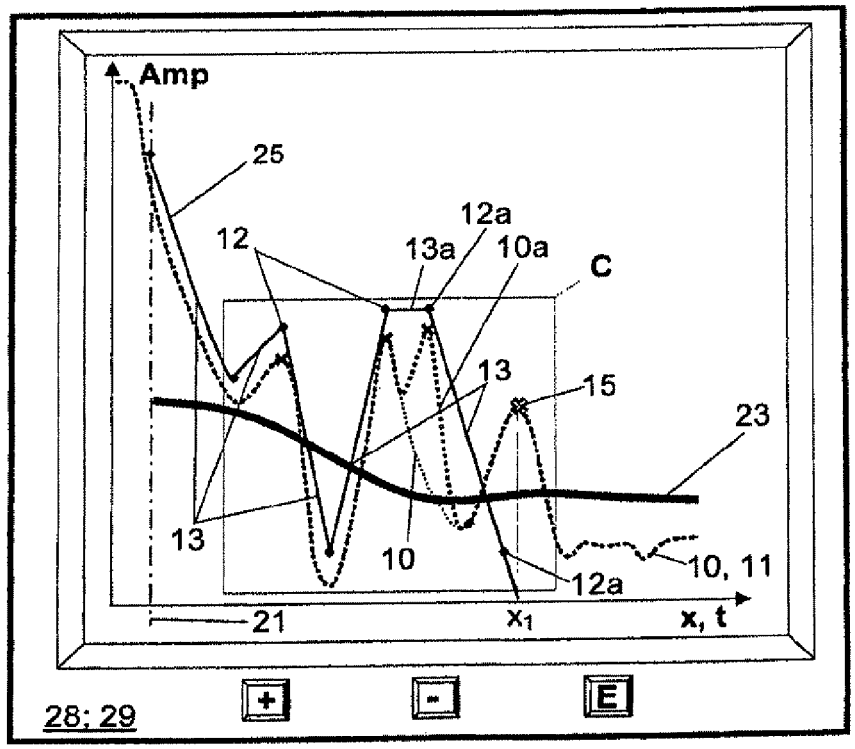
FIG. 6 is a presentation of the graph of FIG. 5 at the end of the processing mode of the evaluation curve and/or the masking curve.

In order to integrate the new data point 12a into the reduced masking curve, in given cases, an automatic routine is provided, which, in regions between two data points 12, 12a, in which two connecting functions 13 overlap, forms a new connecting function 13a, which directly connects these two data points 12, 12a with one another, and thus forms an adapted, reduced masking curve 25. Furthermore, it is also an option that the operator specifies via the input/output unit 28 only one additional data point 12a in the masking curve 22 and/or the evaluation curves 23, and this additional data point 12a is automatically integrated via a newly formed connecting function 13a into the reduced masking curve 22a. Used as connecting functions 13, 13a can be a piecewise linear interpolation, a spline interpolation and/or a polynomial interpolation. This integration of the additional data point 12a into the reduced masking curve 25 is shown in FIG. 6.

Figure 7:
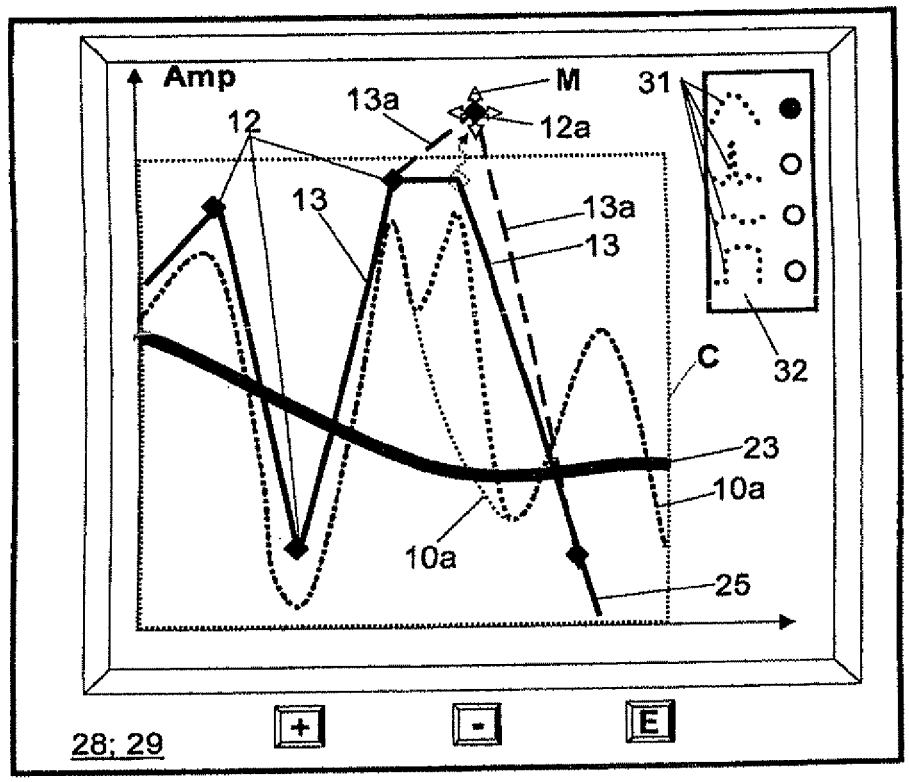
FIG. 7 is an enlargement of detail C of the graph of FIG. 6.

Another modifying of the reduced masking curve 25 is shown in FIG. 7. FIG. 7 shows, in such case, an enlarged section C of FIG. 6. In a processing mode, it is possible for the operator to select by means of the mouse pointer M a particular data point 12 in the reduced masking curve 25, and to change its location, i.e. its value and/or position. The selection and/or the change in the location of the positions 12 can, for example, occur via a plus key + and a minus key −, and the confirmation command via an enter key. The input/output unit 28 can also be embodied as a touch screen, in the case of which the modifying of the graphs occurs directly by a touching of the representation on the screen. By means of this touch-screen, long-lived, reliable and user friendly user interfaces can be created. Furthermore, touch-screen or contact-sensitive screens are compactly embodied and assure that the available installation space is utilized optimally, because the input device is already integrated in the display unit. A further advantage of the touch-screen is its durability and ease of maintenance. It should moreover be emphasized that, due to the visual relationship of the action of the operator and the subsequent reaction of the device or the display, the sensor screens shorten the effective training times of the operating personnel. They additionally exhibit a high degree of cleanliness, user comfort and simplification of applications.

The positions of the individual data points 12 in the masking curve 22 and/or the evaluation curve 23 can, in a processing mode, be changed by the operator, for example, by moving a mouse pointer M on the display unit 28 or the external service unit 29 The operator can, in such case, establish whether the change in position of an individual data point also has effects on the left and/or right neighboring data points 12l, 12r, or on a group of data points 12. For this, the operator can select on the influence profile display 32 different influence profiles 31. In this selection of the influence profile, in the case of a change in the position of an individual data point 12 of the masking curve 22 and/or the evaluation curve 23, the positions of the left and/or right, neighboring data points 12r, 12l are changed. These changes in the positions of individual data points 12 and/or of groups of data points 12 are effected by means of an equalizing function with adjustable influence profiles 31, which adapt the positions of the neighboring data points (12) corresponding to the adjusted influence profiles.

The data points 12 of the envelope curve 11, the masking curve 22 and/or the evaluation curve 23 are stored in a list or a table. This equalizing function with the predetermined influence profiles can, for example, be embodied in such a manner, that the equalizing function is stored by means of a profile list of multipliers corresponding to the influence profile. If the position of a data point 12 in the evaluation curve 23 and/or the masking curve 22 is changed by the operator, the multipliers in the selected profile list are multiplied with the value of the change in the position of the data point 12, and the results are added to the corresponding entries in the lists of the left and right neighboring data points 12l, 12r.

Figure 8:
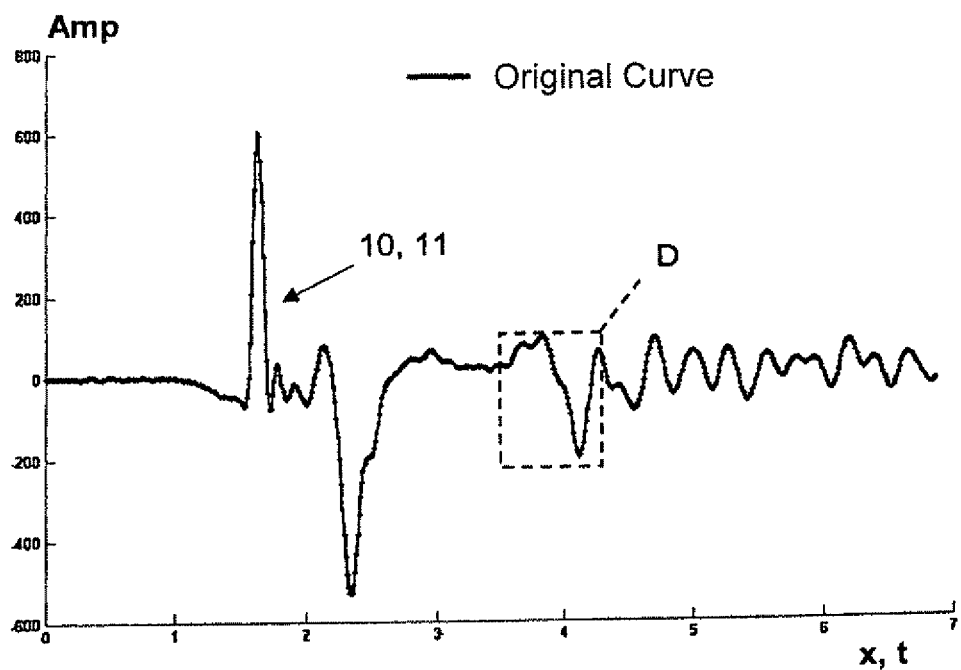
FIG. 8 is a third graph from the measuring device from FIG. 1, showing an envelope curve.

The fifth opportunity for reducing the number of data points 12 in an echo function 10, an envelope curve 11, a masking curve 22 and/or an evaluation curve 23 is presented in FIG. 8 through FIG. 11. FIG. 8 shows an echo function 10 or its envelope curve 11. On the abscissa is plotted travel distance x in meters or travel time t in seconds, and on the ordinate is plotted amplitude value Amp in millivolts.

Figure 9:
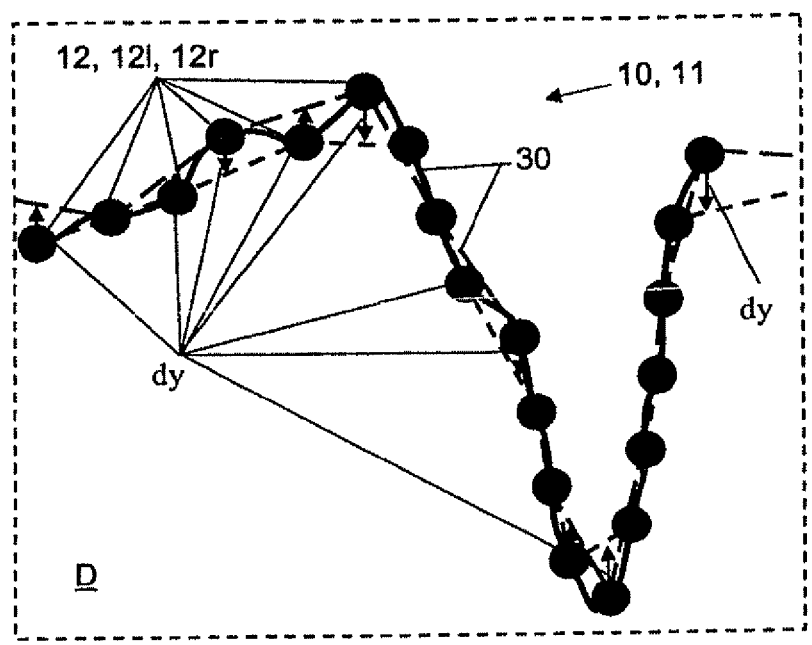
FIG. 9 is an enlargement of detail D of the envelope curve of FIG. 8.
Figure 10:
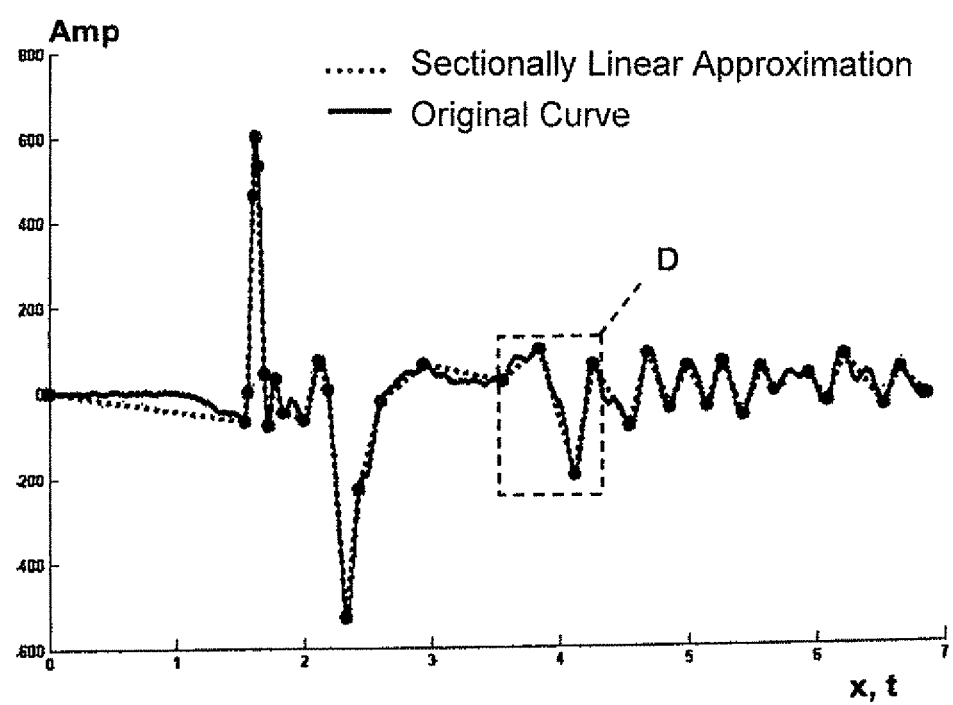
FIG. 10 is a first presentation of a reduction of the data locations of the graph of FIG. 8 by means of a piecewise linear approximation of the envelope curve with a small deviation.
Figure 11:
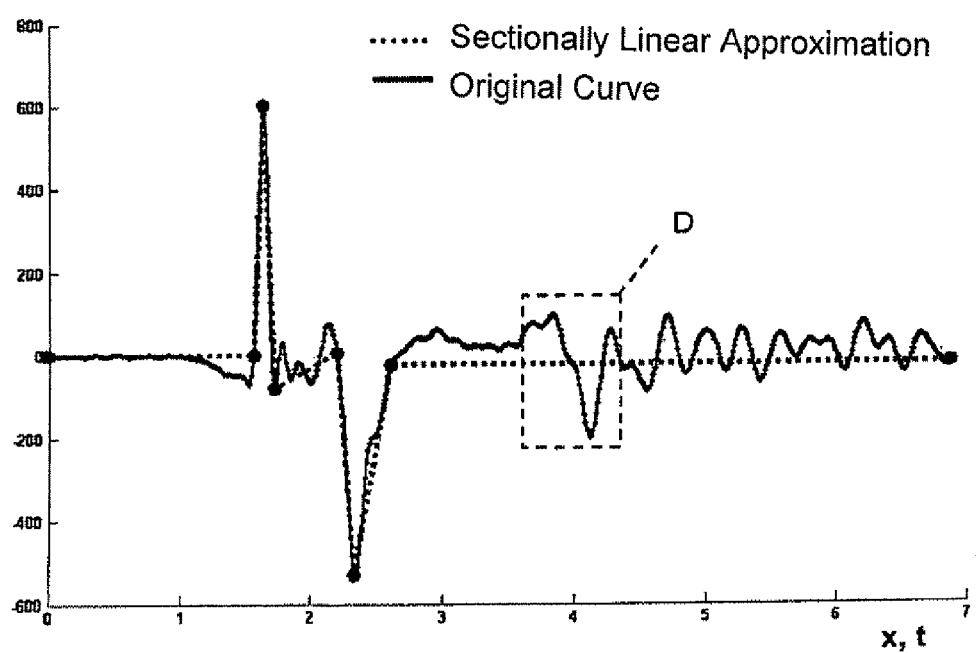
FIG. 11 is a second presentation of a reduction of the data locations of the graph by means of a piecewise linear approximation of the envelope curve with a greater deviation.

In FIG. 9, an enlargement of detail D of the echo function 10 and/or the envelope curve 11 with the positions 12 of FIG. 8, FIG. 10 and FIG. 11 is shown. By a sectionally linear approximation, the reduction algorithm calculates, for each support position 12 of the envelope curve 11, the masking curve 22 and/or the evaluation curve 23, the amplitude spacings dy of the data points 12 with respect to a line 30 through the left and right neighboring data points 12l, 12r. In a next step, the data points 12 found by the reduction algorithm to have the smallest amplitude spacings (dy) are deleted, at least in the considered section of the envelope curve (11), the masking curve (22) and/or the evaluation curve (23). In an additional step, new amplitude spacings dy are calculated and correspondingly stored in the list only for the left and right neighboring data points 12l, 12r of the erased data points 12. The sectionally linear approximation is cyclically performed, until, for example, a predetermined deviation of the amplitude spacings dy and/or a predetermined minimal number of data points 12 is reached. The reduction algorithm of the invention by means of the sectionally linear approximation has the advantage, that this algorithm requires little computing power, and the data points 12 are reduced in a manner such that the deviation or the approximation error is minimum, and the masking curve 22 and/or the evaluation curve 23 are reduced to the most fundamental characteristics of these curves.

FIG. 10 shows a reduction of the data points 12 to 6 percent of the data points 12 of the original curve by means of a piecewise linear approximation of the envelope curve 11 to a deviation of the amplitude spacings dy of less than 50 millivolts. Furthermore, FIG. 11 shows a reduction of the data points to only 1 percent of the data points 12 of the original curve by means of a piecewise linear approximation of the envelope curve with a greater deviation of the amplitude spacings dy of less than 400 millivolts.

The reducing and modification of the data points 12 is not limited to only the masking curve 22 as shown in FIG. 1-11, but can also be applied to the evaluation curve 23. A option of changing the echo function 10 and the envelope curve 11 was not attempted; such is, however, readily technically feasible.

List of Reference Characters 1 field device, measuring device
    2 control/evaluation unit
    3 transmitting/receiving unit
    4 communication unit 5 container
6 transmitting/receiving element
7 medium
8 interface, surface
9 measurement transmitter
10 echo function, echo curve
10a changed echo function
11 envelope function, envelope curve
12 data points
12a additional data point
12b deviating data point
12l left neighboring data point
12r right neighboring data point
13 connecting functions
13a new connecting function
14 echo signal
15 wanted echo signal
16 disturbance echo signal
17 slope length
19 installed objects, disturbing element
20 drag pointer
21 zero line
22 masking curve
23 evaluation curve
24 regression line
25 reduction curve
26 peak
27 point of inflection
28 input/output unit
29 external service unit
30 line
31 influence profiles
32 influence profile display
Amp amplitude value
S transmission signal
R reflection signal
K disturbance signal
x travel distance, position, distance
$x_1$ position of the wanted echo signal
t travel time
+ plus-key
− minus-key
E enter-key
M mouse pointer
h fill level
dy amplitude spacing

The invention claimed is:

1. A method for ascertaining and monitoring the fill level of a medium in a container by means of a field device of automation and process control technology, comprising the steps of:
   transmitting transmission signals toward the medium and receiving them as reflection signals by means of a transmitting/receiving unit of the field device;
   registering the transmission signals and the reflection signals by means of data points in an envelope curve dependent on travel time or travel distance;
   registering disturbance echo signals by means of data points in a masking curve ascertained in a first measuring cycle from the envelope curve of an empty container;
   ascertaining an evaluation curve from the envelope curve by a smoothing procedure in a first measuring cycle;
   connecting data points of the envelope curve, the evaluation curve and/or the masking curve with one another via connecting functions and intermediate values are thus produced;
   reducing the number of data points in the masking curve and/or in the evaluation curve by means of a reduction algorithm improving processability of the masking curve and/or the evaluation curve; and
   ascertaining at least one wanted echo signal in the current envelope curve by an echo search algorithm, by means of the reduced masking curve and/or the reduced evaluation curve.

2. The method as claimed in claim 1, wherein:
   data points of the envelope curve, the masking curve and/or the evaluation curve are reduced by a sectionally linear approximation serving as the reduction algorithm, in that, for all data points of at least a section of the envelope curve, the masking curve and/or the evaluation curve, amplitude spacings of the data points with respect to a line between left and right neighboring data points are ascertained; and
   data points having smallest ascertained amplitude spacings are deleted, at least in said section.

3. The method as claimed in claim 2, wherein:
   the sectionally linear approximation is performed cyclically until a predetermined deviation of amplitude spacings and/or a predetermined number of data points is reached.

4. The method as claimed in claim 1, wherein:
   data points of the masking curve and/or the evaluation curve are reduced by a linear regression serving as the reduction algorithm, in that superfluous data points, which do not lie on the regression lines are deleted.

5. The method as claimed in claim 1, wherein:
   data points of the masking curve and/or the evaluation curve are reduced by the reduction algorithm to extreme points, peaks and/or inflection points of the masking curve and/or the evaluation curve.

6. The method as claimed in claim 1, wherein:
   data points in the masking curve and/or the evaluation curve are periodically deleted by the reduction algorithm in a predetermined interval.

7. The method as claimed in claim 1, wherein:
   at each data point in the masking curve and/or the evaluation curve, slopes of connecting functions adjoining on both sides are compared with one another by the reduction algorithm, and, in case of subceeding, or falling beneath, a predetermined difference value for the two slopes, such data point is deleted.

8. The method as claimed in claim 1, wherein:
   during operation mode of the field device, based on a dynamic echo search algorithm by means of an echo tracking of the wanted echo signal and/or the disturbance echo signals in a defined search window, values and/or positions of individual data points in the masking curve and/or the evaluation curve are automatically edited and/or adjusted.

9. The method as claimed in claim 8, wherein:
   histories of the values and/or positions of individual data points in the masking curve and/or the evaluation curve are stored and/or displayed as at least one maximum state and/or minimum state in at least one drag pointer.

10. The method as claimed in claim 1, wherein:
    in a processing mode, the number and/or distance of the data points for performing the reduction algorithm, the connecting functions of individual data points and/or additional data points are specified via an input/output unit on the field device and/or via an external service unit.

11. The method as claimed claim 1, wherein:

in a processing mode, positions of individual data points and/or groups of data points are changed via an input/output unit on the field device and/or via an external service unit.

12. The method as claimed in claim 11, wherein:

the positions of individual data points and/or of groups of data points are changed by means of an equalizing function with adjustable influence profiles, which adjust positions of neighboring data points corresponding to the adjusted influence profiles.

13. The method as claimed in claim 10, wherein:

in the processing mode, additional data points are specified as peaks with falling connecting functions adjoining on both sides and having predefined length and/or predefined slope, and/or in regions between two data points in which two connecting functions overlap, a new connecting function is formed, which connects the two data points with one another.

14. The method as claimed in claim 10, wherein:

additional data points in the masking curve and/or the evaluation curves are placed, and these additional data points are integrated via newly formed connecting functions into the existing masking curve and/or the evaluation curve.

15. The method as claimed in claim 1, wherein:

used as connecting functions are at least a piecewise linear interpolation, a spline interpolation and/or a polynomial interpolation.

16. The method as claimed in claim 1, wherein:

the envelope curve, the masking curve and/or the evaluation curve is sectionally either newly produced in a replacement mode, or, in a superimposing mode, is formed from maximum values of old stored and newly recorded envelope curve, masking curve and/or evaluation curve.

* * * * *